United States Patent [19]

Usui

[11] Patent Number: 4,502,013
[45] Date of Patent: Feb. 26, 1985

[54] INPUT CONVERTING CIRCUIT

[75] Inventor: Masaji Usui, Hyogo, Japan

[73] Assignee: Mitsubishi Denki Kabushiki Kaisha, Tokyo, Japan

[21] Appl. No.: 395,154

[22] Filed: Jul. 6, 1982

[30] Foreign Application Priority Data

Jan. 27, 1981 [JP] Japan .................... 56-11046

[51] Int. Cl.³ .............................. H03K 5/00
[52] U.S. Cl. ...................... 328/26; 307/262; 328/31
[58] Field of Search ............ 328/26, 31, 36, 144

[56] References Cited

U.S. PATENT DOCUMENTS 3,555,432 1/1971 Ellermeyer ............... 328/26
3,569,841 3/1971 Richman ................... 328/26

FOREIGN PATENT DOCUMENTS 28621 3/1977 Japan ..................... 328/26

OTHER PUBLICATIONS

*IBM Tech. Disclre. Bulttn.*, vol. 10, No. 8, 1/68, "Full-Wave Rectifier" by D. Esteban et al., pp. 1287 and 1288.

Primary Examiner—Stanley D. Miller
Assistant Examiner—B. P. Davis
Attorney, Agent, or Firm—Sughrue, Mion, Zinn, Macpeak and Seas

[57] ABSTRACT

A rectifier circuit includes three operational amplifiers, the first of which is provided with feedback loops containing diodes of opposite polarity. The other op-amps are coupled to the output of the first one via the respective diodes, and the outputs thereof are fed back to the inputs thereof and to the input of the input op-amp.

5 Claims, 14 Drawing Figures

FIG. 1
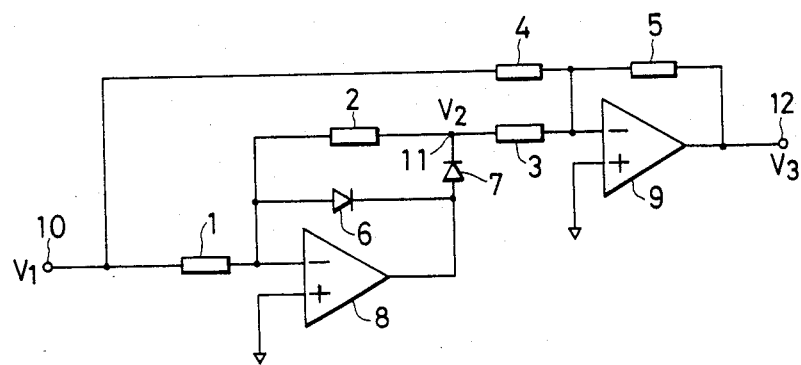
FIG. 2a  V1
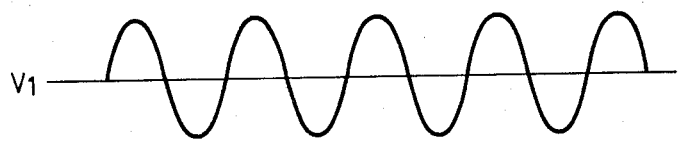
FIG. 2b  V2
FIG. 2c  V3
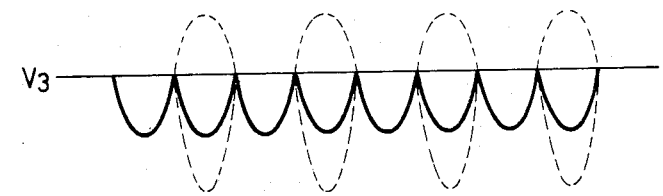

FIG. 3
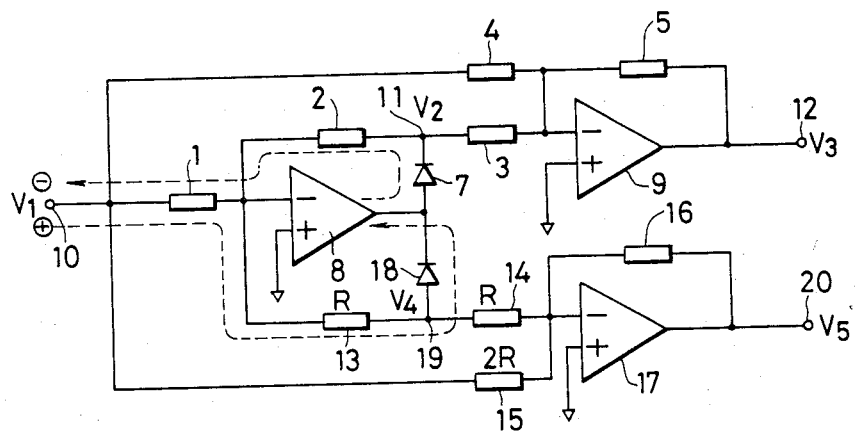
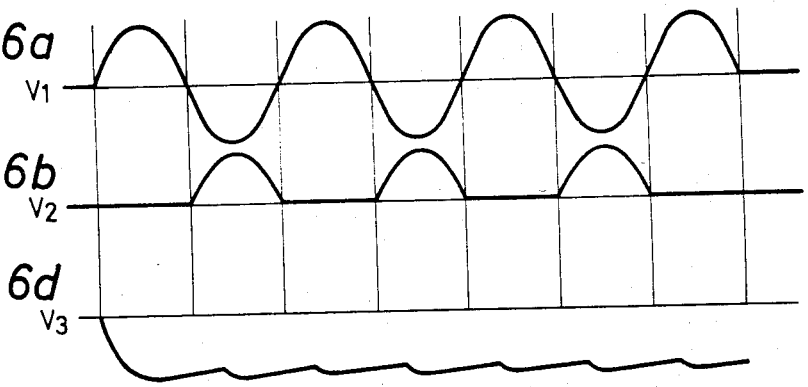
FIG. 6a $V_1$
FIG. 6b $V_2$
FIG. 6d $V_3$

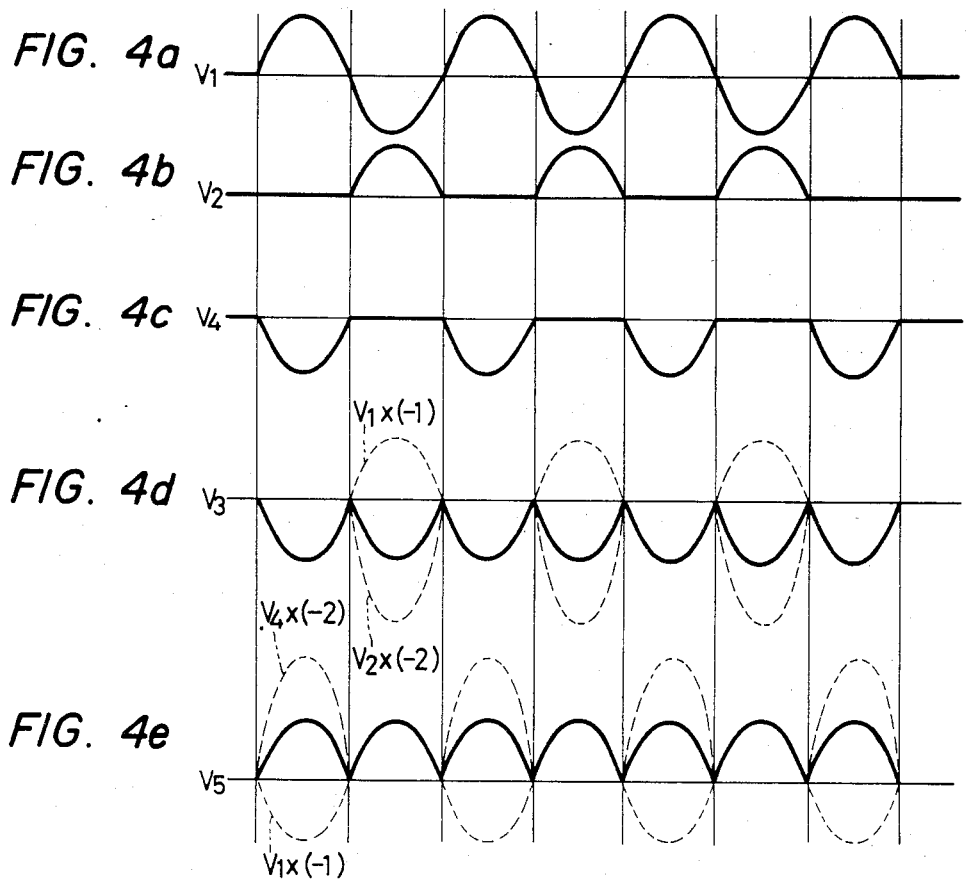

INPUT CONVERTING CIRCUIT

BACKGROUND OF THE INVENTION

This invention relates to converter circuits in which an input signal is converted into one suitable for an electrical device which is operated by the input signal, and more particularly to a circuit for converting the waveform of an input signal into positive and negative full-wave rectification waveforms. Such a circuit is employed as the input circuit of a protective relay device for instance.

A conventional input converting circuit of this type is as shown in FIG. 1. In FIG. 1, reference numerals 1 through 5 designate resistors; 6 and 7, diodes; and 8 and 9, operational amplifiers which form first and second operation circuits with the circuit elements 1 through 7 mentioned above.

The operation of the circuit thus organized will now be described.

In operation, a sinusoidal voltage $V_1$ as shown in FIG. 2a is applied through the resistor 1 to the inversion input terminal of the operational amplifier 8. When the non-inversion input terminal of the amplifier 8 is grounded, a voltage $V_2$ is developed at the connecting point of the diode 7 connected to the output terminal of the amplifier 8 and the resistor 2 which serves as a feedback resistor. The waveform of the voltage $V_2$ is half-wave rectified, as shown in FIG. 2b. When the voltage $V_1$ is positive, the diode 6 connected between the input and output terminals of the operational amplifier 8 is rendered conductive, i.e., the input and output terminals are short-circuited, as a result of which the voltage $V_2$ is at 0 volts. When the voltage $V_1$ is positive, the diode 7 blocks the flow of current to the input terminal of the operational amplifier through the resistor 2.

The voltage $V_2$ is applied through the resistor 3 to the inversion input terminal of the operational amplifier 9, the non-inversion input terminal of which is grounded, and the output terminal 12 of the amplifier 9 is connected through the resistor 5 to the inversion input terminal of the same and is connected through the resistors 5 and 4 to the input terminal 10. As a result, a voltage $V_3$ which is full-wave rectified as shown in FIG. 2c is developed at the output terminal 12. Therefore, if each of the resistances of the resistors 1, 2 and 3 is represented by R, the resistance of each of the resistors 4 and 5 is represented by 2R, then when $V_1 > 0$, $V_3 = -V_1$, and
when $V_1 < 0$, $V_3 = V_1 - 2V_2 = V_1 - 2V_1 = -V_1$ If a capacitor is connected in parallel with the resistor 5, which is the feed-back resistor of the operational amplifier 9, then a voltage, which is obtained by smoothing the voltage $V_3$, is provided at the output terminal 12.

The conventional input converting circuit is designed as described above. Therefore, in order to obtain full-wave rectification and waveform smoothing, the respective circuits described above must be provided.

SUMMARY OF THE INVENTION

An object of this invention is to eliminate the above-described drawback accompanying a conventional input converting circuit. More specifically, an object of the invention is to provide an input converting circuit in which one and the same circuit can provide a non-smoothed output, a smoothed output, or positive and negative outputs.

BRIEF DESCRIPTION OF THE DRAWINGS

FIG. 1 is a circuit diagram showing a conventional input converting circuit;

FIGS. 2a–2c are waveform diagrams for describing the operation of the circuit of FIG. 1;

FIG. 3 is a circuit diagram of a first example of an input converting circuit according to this invention;

FIGS. 4a–4e are waveform diagrams for describing the operation of the input converting circuit of FIG. 3;

FIGS. 6a, 6b and 6d are waveform diagrams for describing the operation of the circuit of FIG. 5a.

DETAILED DESCRIPTION OF THE PREFERRED EMBODIMENTS

Figure 5A:
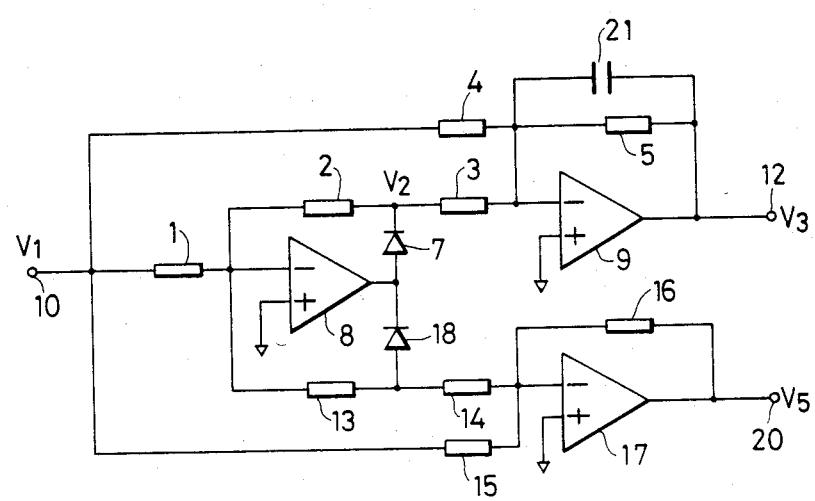
FIGS. 5a and 5b are circuit diagrams showing second and third examples of the input converting circuit according to the invention.

FIG. 3 is a circuit diagram showing a first example of the input converting circuit according to the invention. In FIG. 3, those components which have been previously described with reference to FIG. 1 are therefore designated by the same reference numerals or characters. Further in FIG. 3, reference numeral 13 designates a resistor, one terminal of which is connected to the resistor 1. A resistor 14 has one terminal connected to the resistor 13, and a resistor 15 has one terminal connected to the input terminal 10. A resistor 16 has one terminal connected to the resistors 14 and 15, and an operational amplifier 17 has its inversion input terminal connected to the resistors 14, 15 and 16, a non-inversion input terminal grounded, and an output terminal connected through the resistor 16 to the inversion terminal. Further in FIG. 3, reference numeral 18 designates a diode connected between the operational amplifier 8 and the connecting point 19 of the resistors 13 and 14; and 20, the output terminal of the operational amplifier 17.

The operation of the input converting circuit thus organized will now be described. It is assumed that the resistance of each of the resistors 13 and 14 is represented by R, the resistance of each of the resistors 15 and 16 is represented by 2R, and the resistances of the other resistors are the same as those described with reference to FIG. 1. The input voltage $V_1$ is as shown in FIG. 4. When the voltage is positive, current flows in the resistors 1 and 13 and the diode 18 as indicated by the dotted line in FIG. 3. Therefore, the voltage $V_4$ at the connecting point 19 becomes $-V_1$ ($V_4 = -V_1$) (FIG. 4c). In this case, the output of the operational amplifier 8 equals $-V_1$-(forward voltage drop across the diode 18). Therefore, the diode 7 is non-conductive (off), and the voltage $V_2$ at the connecting point 11 is 0 V, which is equal to the voltage at the inversion input terminal of each of the operational amplifiers 8 and 9. (FIG. 4b). While the voltage $V_1$ is negative, current flows through the diode 7 and the resistors 2 and 1 as indicated by the dot chain line in FIG. 3, and the voltage $V_2$ at the connecting point 11 is $-V_1$ ($V_2 = -V_1$) (FIG. 4b).

In this operation, the diode 18 is non-conductive (off) and the voltage $V_4$ at the connecting point 19 is 0 V. By repeating the above-described operation, the voltage $V_3$ (FIG. 4d) at the output terminal 12 has a negative full-wave rectified waveform similarly as in the case of FIG. 1, and the voltage $V_5$ (FIG. 4c) at the output terminal 20 has a positive full-wave rectified waveform.

Figure 5B:
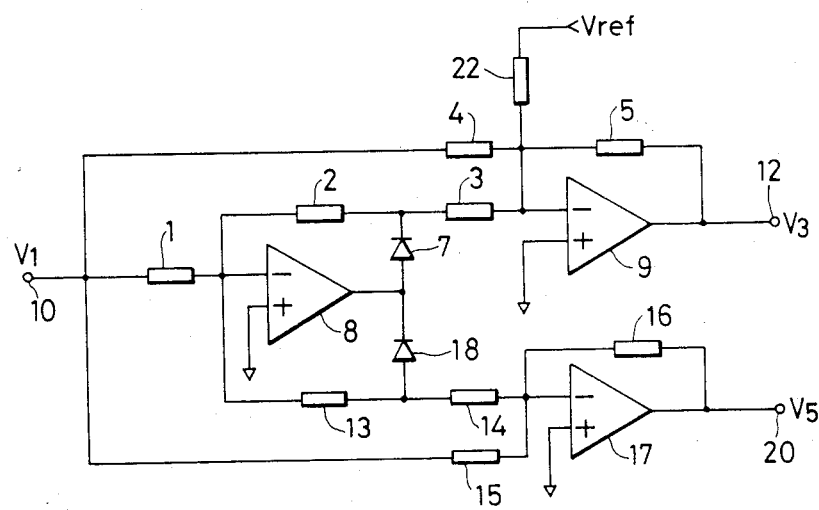

In the first example described above, the resistor 5 is alone employed to feed back the output of the operational amplifier 9. However, a capacitor 21 may be connected in parallel to the resistor 5 as shown in FIG. 5a, to provide a smoothed output at the output terminal 12; and the same effect can be obtained by applying a reference voltage $V_{ref}$ through a resistor 22 to the inversion input terminal of the operational amplifier 9 as shown in FIG. 5b. However, it should be noted in this case that the inversion input terminals of the operational amplifiers 9 and 17 are maintained at 0 V in a phantom manner similarly as in the case of the conventional circuit. FIG. 6 is a diagram showing waveforms obtained with device of FIG. 5a.

As is apparent from the above description, according to the invention, positive and negative full-wave rectification waveforms can be obtained simultaneously by employing three operational amplifiers in combination. The input converting circuit according to the invention, being simple in circuitry, can be manufactured at low cost.

What is claimed is:

1. An input converting circuit, comprising, an input terminal adapted to receive an input ac voltage;

first and second output terminals independent from one another;

a first operational amplifier circuit comprising, an operational amplifier having a grounded non-inverting input, an inverting input and an output; a first resistor connected between said input terminal and said inverting input; a first feedback circuit connected between said output and said inverting input and comprising a series connection of a second resistor and a first diode, said first diode being connected to provide current flow in said first feedback circuit only when the voltage at said input terminal is negative with respect to ground; and a second feedback circuit connected between said amplifier output and said inverting input and comprising a series connection of a third resistor and a second diode, said second diode connected to provide current flow in said second feedback circuit only when the voltage at said input terminal is positive; whereby the voltage at the point of connection between said first diode and second resistor is a negative half-wave rectified voltage, and said voltage at the point of connection between said second diode and said third resistor is a positive half-wave rectified voltage;

a second operational amplifier circuit comprising, a second operational amplifier having a grounded non-inverting input, an inverting input, and an output; a fourth resistor connected between said inverting input and the connection point of said first diode and second resistor; a fifth resistor connected between said inverting input and said input terminal; and a sixth resistor connected between said output and said inverting input; said output of said second operational amplifier being connected to the first output terminal of said converting circuit and providing a negative fullwave rectified voltage output, a third operational amplifier circuit comprising, a third operational amplifier having a grounded non-inverting input, an inverting input, and an output; a seventh resistor connected between said inverting input and the connection point of said second diode and third resistor; an eighth resistor connected between said inverting input and said input terminal; and a ninth resistor connected between said output and said inverting input; said output of said third operational amplifier being connected to the second output terminal of said converting circuit and providing a positive full-wave rectified voltage output of opposite polarity to that provided at said first output terminal.

2. An input converting circuit as claimed in claim 1 further comprising a capacitor connected in parallel with said sixth resistor to smooth the rectified voltage at said first output terminal.

3. An input converting circuit as claimed in claim 2 wherein each of the first, second, third, fourth and seventh resistors has a value of $R_1$ ohms, and each of the fifth, sixth, eighth and ninth resistors has a value of $R_2$ ohms, where $R_2 = 2R_1$.

4. An input converting circuit as claimed in claim 1 further comprising a tenth resistor connected at one end to the inverting input of said second operational amplifier, the other end adapted for connection to a reference voltage.

5. An input converting circuit as claimed in claim 1 wherein each of the first, second, third, fourth and seventh resistors has a value of $R_1$ ohms and each of the fifth, sixth, eighth and ninth resistors has a value of $R_2$ ohms, where $R_2 = 2R_1$.

* * * * *